US009391771B2

(12) United States Patent
Kruglick

(10) Patent No.: US 9,391,771 B2
(45) Date of Patent: Jul. 12, 2016

(54) SERVER-CLIENT SECRET GENERATION WITH CACHED DATA

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/390,368

(22) PCT Filed: Feb. 6, 2014

(86) PCT No.: PCT/US2014/015058
§ 371 (c)(1),
(2) Date: Oct. 2, 2014

(87) PCT Pub. No.: WO2015/119610
PCT Pub. Date: Aug. 13, 2015

(65) Prior Publication Data
US 2015/0349953 A1    Dec. 3, 2015

(51) Int. Cl.
*H04L 9/08* (2006.01)
*H04L 29/06* (2006.01)
(52) U.S. Cl.
CPC ............ *H04L 9/0861* (2013.01); *H04L 9/0869* (2013.01); *H04L 9/0886* (2013.01); *H04L 63/0428* (2013.01); *H04L 63/061* (2013.01)
(58) Field of Classification Search
None
See application file for complete search history.

(56) References Cited

U.S. PATENT DOCUMENTS

| 6,182,220 | B1 | 1/2001 | Chen et al. |
| 7,146,643 | B2 | 12/2006 | Dapp et al. |
| 8,402,540 | B2 | 3/2013 | Kapoor et al. |
| 2009/0144546 | A1 | 6/2009 | Jancula et al. |
| 2010/0131755 | A1* | 5/2010 | Zhu et al. ............ 713/155 |
| 2010/0306525 | A1 | 12/2010 | Ferguson |
| 2011/0231650 | A1 | 9/2011 | Coulier |
| 2013/0129080 | A1* | 5/2013 | Tang et al. ............ 380/28 |
| 2013/0151470 | A1 | 6/2013 | Resch et al. |
| 2013/0227292 | A1 | 8/2013 | Suffling |
| 2014/0047524 | A1* | 2/2014 | Auger ............ 726/7 |

FOREIGN PATENT DOCUMENTS

EP    2278833 A1    1/2011

OTHER PUBLICATIONS

"Combinations and Permutations Calculator," accessed at http://web.archive.org/web/20140123040215/http://www.mathsisfun.com/combinatorics/combinations-permutations-calculator.html, accessed on Sep. 6, 2014, pp. 1-4.

(Continued)

*Primary Examiner* — David Le
(74) *Attorney, Agent, or Firm* — Turk IP Law, LLC

(57) ABSTRACT

Technologies are provided for shared secret generation between a server and a client using cached data. In some examples, a server may send a number of encrypted secrets to a client that caches a number of data blocks previously provided by the server. Each of the encrypted secrets may be encrypted using a data block that may or may not be cached at the client. The client may then identify the encrypted secrets that correspond to data blocks in its cache and use those data blocks to recover those secrets. The client may then encrypt a message for the server using the recovered secrets. Upon reception of the message, the server may then recover the message using its knowledge of the data blocks cached at the client.

19 Claims, 7 Drawing Sheets

(56) References Cited

OTHER PUBLICATIONS

"Advanced persistent threat," accessed at http://web.archive.org/web/20131207031929/http://en.wikipedia.org/wiki/Advanced_persistent_threat, last modified on Dec. 6, 2013, pp. 1-5.

"Dictionary attack," accessed at http://web.archive.org/web/20140122022526/http://en.wikipedia.org/wiki/Dictionary_attack, last modified on Jan. 18, 2014, p. 1-4.

"Junos Pulse Application Acceleration Platforms—Juniper Networks," accessed at http://web.archive.org/web/20131019062740/http://www.juniper.net/us/en/products-services/application-acceleration/, accessed on Sep. 6, 2014, p. 1.

"Riverbed Steelhead Product Family," accessed at http://web.archive.org/web/20101230085908/http://www.riverbed.com/docs/DataSheet-Riverbed-FamilyProduct.pdf, accessed on Sep. 6, 2014, pp. 1-8.

"Web application/Caching," accessed at http://web.archive.org/web/20131205203445/http://docforge.com/wiki/Web_application/Caching, accessed on Sep. 6, 2014, pp. 1-8.

"Write amplification," accessed at http://web.archive.org/web/20131030022800/http://en.wikipedia.org/wiki/Write_amplification, last modified on Oct. 3, 2013, pp. 1-11.

Algesheimer, J., et al., "Efficient computation modulo a shared secret with application to the generation of shared safe-prime products," Advances in Cryptology—CRYPTO 2002, vol. 2442, pp. 417-432 (2002).

Catalano, D., et al., "Computing inverses over a shared secret modulus," in Advances in Cryptology—Eurocrypt 2000, vol. 1807, pp. 190-206 (2000).

Dhage, S.N., et al., "Intrusion detection system in Cloud computing environment," International Conference and Workshop on Emerging Trends in Technology (ICWET 2011), pp. 235-239 (2011).

Gosney, J.M., "Password cracking in record time with giant GPU cluster," accessed at http://web.archive.org/web/20131207064928/http://www.h-online.com/security/news/item/Password-cracking-in-record-time-with-giant-GPU-cluster-1763322.html, posted on Dec. 6, 2012, pp. 1-2.

International search report and written opinion for PCT application No. PCT/US2014/15058 mailed on Jul. 8, 2014.

Leyden, J., "Advanced Persistent Threats get more advanced, persistent and threatening," http://web.archive.org/web/20130822061148/http://www.theregister.co.uk/2013/04/04/apt_trends_fireeye/, posted on Apr. 4, 2013, pp. 1-2.

McWhorter, D., "Mandiant Exposes APT1—One of China's Cyber Espionage Units & Releases 3,000 Indicators," accessed at http://web.archive.org/web/20131208205232/https://www.mandiant.com/blog/mandiant-exposes-apt1-chinas-cyber-espionage-units-releases-3000-indicators/, posted on Feb. 18, 2013, pp. 1-3.

Simmons, G.J., "Prepositioned shared secret and/or shared control schemes," in Advances in Cryptology—EUROCRYPT'89, vol. 434, pp. 436-467 (1990).

\* cited by examiner

COMPUTER PROGRAM PRODUCT 700

SIGNAL BEARING MEDIUM 702

704 AT LEAST ONE OF

ONE OR MORE INSTRUCTIONS FOR TRANSMITTING MULTIPLE ENCRYPTED SECRETS CORRESPONDING TO MULTIPLE DATA BLOCKS FROM THE SERVER TO THE CLIENT, EACH ENCRYPTED SECRET ENCRYPTED USING A RESPECTIVE DATA BLOCK;

ONE OR MORE INSTRUCTIONS FOR RECOVERING, AT THE CLIENT, A FIRST SUBSET OF SECRETS FROM THE ENCRYPTED SECRETS CORRESPONDING TO A FIRST SUBSET OF DATA BLOCKS STORED AT THE CLIENT;

ONE OR MORE INSTRUCTIONS FOR ENCRYPTING A MESSAGE AT THE CLIENT USING THE FIRST SUBSET OF SECRETS;

ONE OR MORE INSTRUCTIONS FOR TRANSMITTING THE MESSAGE FROM THE CLIENT TO THE SERVER; AND

ONE OR MORE INSTRUCTIONS FOR RECOVERING, AT THE SERVER, THE MESSAGE USING A SECOND SUBSET OF SECRETS CORRESPONDING TO A SECOND SUBSET OF DATA BLOCKS KNOWN BY THE SERVER TO BE PREVIOUSLY STORED AT THE CLIENT.

| COMPUTER-READABLE MEDIUM 706 | RECORDABLE MEDIUM 708 | COMMUNICATIONS MEDIUM 710 |

FIG. 7

SERVER-CLIENT SECRET GENERATION WITH CACHED DATA

This Application is the National Stage filing under 35 U.S.C §371 of PCT Application Ser. No. PCT/US14/15058 filed on Feb. 6, 2014. The PCT Application is herein incorporated by reference in its entirety.

BACKGROUND

Unless otherwise indicated herein, the materials described in this section are not prior art to the claims in this application and are not admitted to be prior art by inclusion in this section.

Web-enabled applications continue to grow in popularity. Some web applications may take advantage of application caches that store generated data, frequently accessed data, and/or reusable elements relatively close to end users, thereby reducing latency and accelerate application performance. Such caching may be implemented at a number of different levels. For example, content delivery networks (CDNs) are geographically distributed networks that may store static content close to end users. In some situations, application accelerators may improve web application or network performance by caching web application data at end user devices, for example on mobile devices such as laptops or smartphones.

SUMMARY

The present disclosure generally describes techniques to generate shared secrets using cached data.

According to some examples, a method is provided to generate shared secrets between a server and a client. The method may include transmitting, by the server, multiple encrypted secrets corresponding to multiple data blocks to the client, the multiple encrypted secrets generated by encrypting each secret with a respective data block in the multiple data blocks. The method may further include recovering, by the client, a first subset of the multiple secrets from the encrypted secrets, where the first subset of secrets corresponds to a first subset of data blocks stored at the client and the first subset of data blocks is a subset of the multiple data blocks. The method may further include encrypting a message at the client using the first subset of secrets and transmitting, by the client, the message to the server. The method may further include recovering, by the server, the message using a second subset of the multiple secrets, where the second subset of secrets corresponds to a second subset of data blocks known by the server to be previously stored at the client and the second subset of data blocks is a subset of the multiple data blocks.

According to other examples, a method for a server is provided to generate shared secrets with a client. The method may include generating multiple encrypted secrets corresponding to multiple data blocks by encrypting each secret in a set of multiple secrets with a respective data block in the multiple data blocks. The method may further include transmitting the multiple encrypted secrets to the client and receiving, from the client, a message encrypted using at least one secret from the multiple secrets. The method may further include recovering the message using a first subset of the multiple secrets, where the first subset of the secrets corresponds to a first subset of data blocks known by the server to be previously stored at the client and the first subset of data blocks is a subset of the multiple data blocks.

According to further examples, a server is provided to generate shared secrets with a client. The server may include a memory and a processing module. The memory may be configured to store instructions and multiple data blocks. The processing module may be configured to generate multiple encrypted secrets corresponding to multiple data blocks by encrypting each secret in a set of multiple secrets using a respective data block in the multiple data blocks. The processing module may be further configured to transmit the multiple encrypted secrets to the client and receive from the client a message encrypted using at least one secret from the multiple secrets. The processing module may be further configured to recover the message using a first subset of the multiple secrets, where the first subset of secrets corresponds to a first subset of data blocks known by the server to be previously stored at the client and the first subset of data blocks is a subset of the multiple data blocks.

According to yet further examples, a method for a client is provided to use shared secrets generated with a server. The method may include receiving from the server multiple encrypted secrets corresponding to multiple data blocks and recovering a first subset of secrets from the encrypted secrets, where the first subset of secrets corresponds to the first subset of data blocks. The method may further include encrypting a message using the first subset of secrets and transmitting the message to the server.

According to some examples, a client is provided to generate shared secrets with a server. The client may include a memory and a processing module. The memory may be configured to store instructions and a first subset of data blocks, where the first subset of data blocks is a subset of multiple data blocks. The processing module may be configured to receive from the server multiple encrypted secrets corresponding to multiple data blocks and recover a first subset of secrets from the encrypted secrets, where the first subset of secrets corresponds to the first subset of data blocks. The processing module may be further configured to encrypt a message using the first subset of secrets and transmit the message to the server.

According to other examples, a computer readable medium may store instructions which when executed on one or more computing devices may execute a method to generate shared secrets between a server and a client. The methods may be similar to the methods described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 illustrates a block diagram of an example computer program product, all arranged in accordance with at least some embodiments described herein,

DETAILED DESCRIPTION

Figure 1:
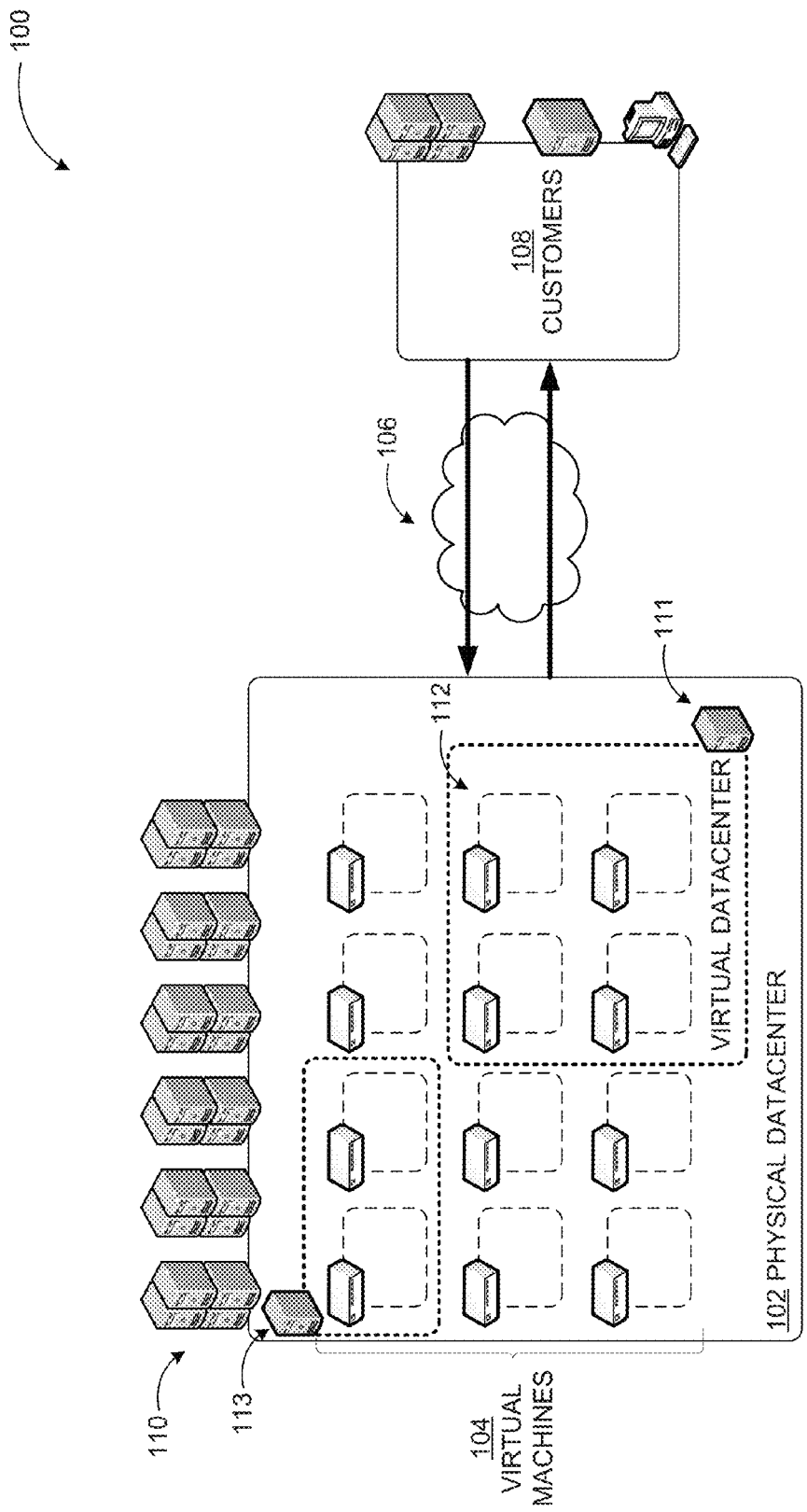
FIG. 1 illustrates an example datacenter-based system where server-client shared secrets generation using cached data may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to shared secret generation between a server and a client using cached data.

Briefly stated, technologies are generally described for shared secret generation between a server and a client using cached data. In some examples, a server may send a number of encrypted secrets to a client that caches a number of data blocks previously provided by the server. Each of the encrypted secrets may be encrypted using a data block that may or may not be cached at the client. The client may then identify the encrypted secrets that correspond to data blocks in its cache and use those data blocks to recover those secrets. The client may then encrypt a message for the server using the recovered secrets. Upon reception of the message, the server may then recover the message using its knowledge of the data blocks cached at the client.

A datacenter as used herein refers to an entity that hosts services and applications for customers through one or more physical server installations and one or more virtual machines executed in those server installations. Customers of the datacenter, also referred to as tenants, may be organizations that provide access to their services for multiple users. One example configuration may include an online retail service that provides retail sale services to consumers (users). The retail service may employ multiple applications (e.g., presentation of retail goods, purchase management, shipping management, inventory management, etc.), which may be hosted by one or more datacenters. Thus, a consumer may communicate with those applications of the retail service through a client application such as a browser aver one or more networks and receive the provided service without realizing where the individual applications are actually executed.

In some situations, it may be desirable to generate shared server-client secrets for use in securing communications between a server and a client. Various embodiments described herein are directed to generation of shared server-client secrets based on cached data. A server configured to store some data may cache a subset of the data at a client to accelerate web application performance at the client. Because the server may know the data subset it cached at the client and the client itself may know what data it has cached, secrets shared between the server and the client may be generated based on the cached data. Additional security may be added to protect against man-in-the-middle attacks by obfuscating the exact data cached at the client, as described in more detail below.

FIG. 1 illustrates an example datacenter-based system where server-client shared secrets generation using cached data may be implemented, arranged in accordance with at least some embodiments described herein.

As shown in a diagram 100, a physical datacenter 102 may include one or more physical servers 110, 111, and 113, each of which may be configured to provide one or more virtual machines 104. For example, the physical servers 111 and 113 may be configured to provide four virtual machines and two virtual machines, respectively. In some embodiments, one or more virtual machines may be combined into one or more virtual datacenters. For example, the four virtual machines provided by the server 111 may be combined into a virtual datacenter 112. The virtual machines 104 and/or the virtual datacenter 112 may be configured to provide cloud-related data/computing services such as various applications, data storage, data processing, or comparable ones to a group of customers 108, such as individual users or enterprise customers, via a network 106.

As described above, an application accelerator may create an application data cache at an end user device. The presence of the cache may accelerate web application performance at the device, because data available in the local cache can be fetched by the application faster than data from the web. An application data cache may be reactive (i.e., storing frequently-accessed content) and/or predictive (storing data the system predicts a user may access, such as mail attachments or updated documents). An accelerator hardware appliance or software installation at a remote server may manage the data cache at the device, for example by scheduling data transfer to avoid interrupting other traffic while tracking the data cached on the device.

Figure 2:
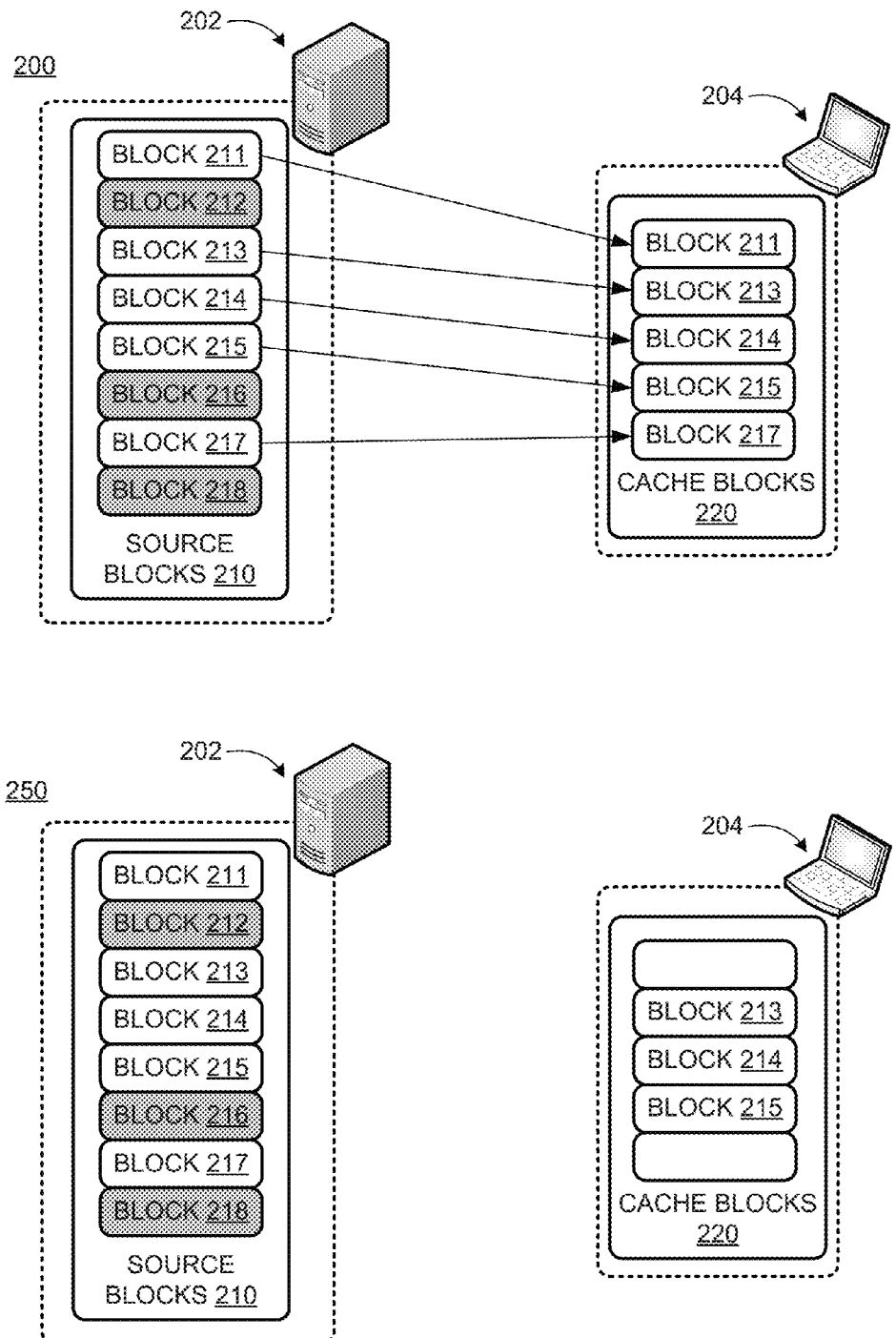
FIG. 2 illustrates an example system where a server may cache data at a client.

FIG. 2 illustrates an example system where a server may cache data at a client, arranged in accordance with at least some embodiments described herein.

According to a diagram 200, a server 202 may communicate with a client 204. The server 202 may be or implement an application accelerator server or appliance, as described above, and may provide application data blocks to cache at end user devices to accelerate applications executing on the devices. For example, the server 202 may store source blocks 210 including blocks 211-218 to cache at end user devices. In turn, the client 204, which may be a physical end user device or an application executing on an end user device, may store cache blocks 220 provided by the server 202 in system memory (e.g., random access memory) or storage memory (e.g., removable or non-removable storage such as hard drives, solid-state drives, and the like). The cache blocks 220 at the client 204 may not include all of the source blocks 210 stored at the server 202. For example, the cache blocks 220 may include the block 211, the blocks 213-215, and the block 217 instead of all of the blocks 211-218. Web applications executing on the end user device may then be accelerated using the cache blocks 770.

In some embodiments, after a web application session has been concluded or paused, the client 204 may indicate that the memory storing some or all of the cache blocks 220 as available, despite still containing the cache blocks 220. This may be done to keep the cache blocks 220 from consuming visible amounts of memory or disk space and impacting other systems or applications. This may mean that the contents of the cache blocks 220 may decrease over time as other applications and data overwrite portions of the cache blocks 220. Moreover, if no active connection is maintained between the server 202 and the client 204, the server 202 may not know which of the blocks in the cache blocks 220 are still present and which have been overwritten. This situation is depicted in a diagram 250, also illustrated in FIG. 2, which shows the contents of the cache blocks 220 after web application processing has concluded or paused for some time. As shown in the diagram 250, the client 204 may have deleted the block 211 and the block 217 from the cache blocks 220. However, this deletion may not be known to the server 202, which may still record that the previously-provided blocks 211, 213-215, and 217 still reside in the cache blocks 220 at the client 204.

Figure 3:
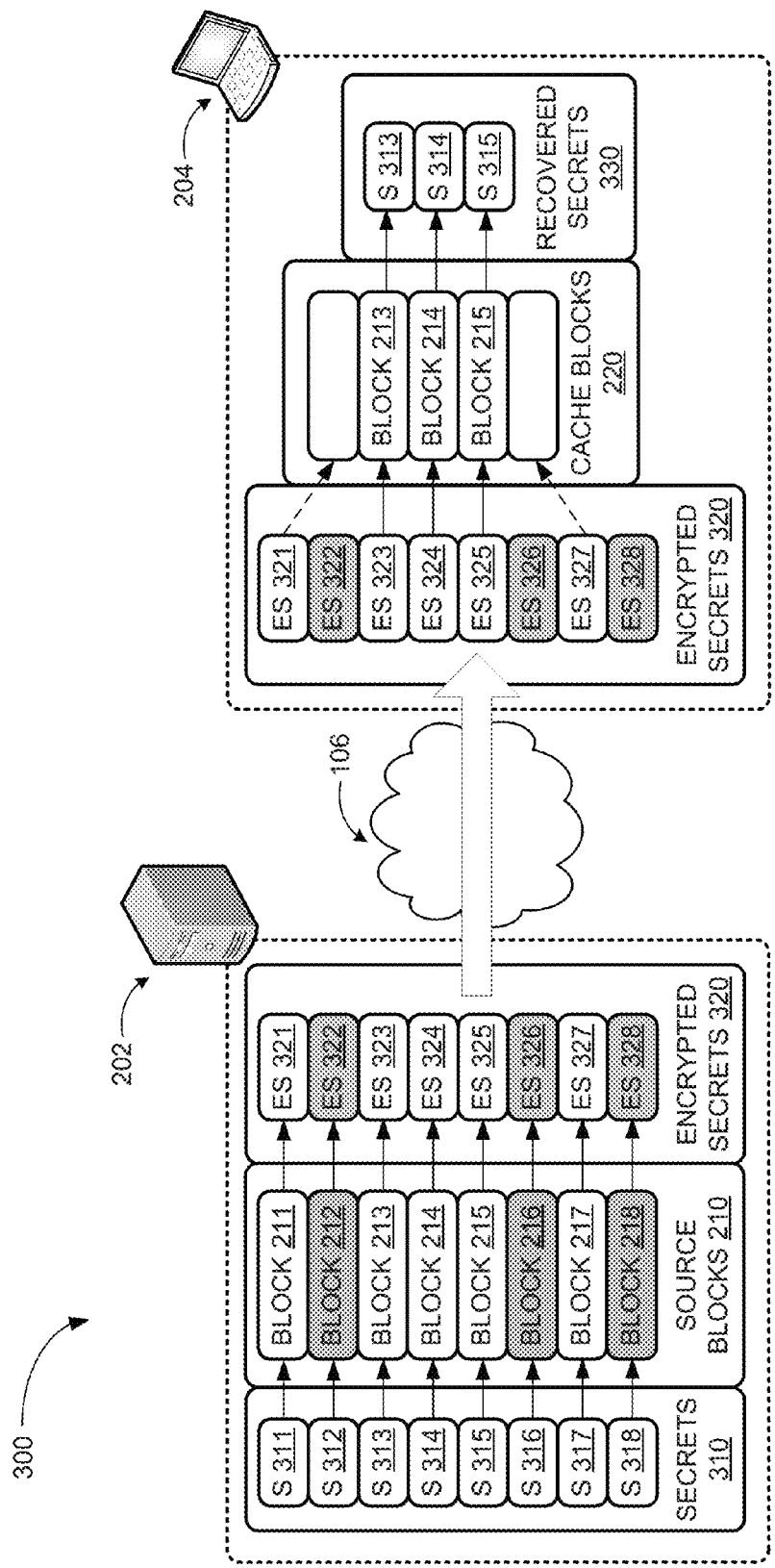
FIG. 3 illustrates an example process where a server may use data cached at a client to generate server-client shared secrets.

FIG. 3 illustrates an example process where a server may use data cached at a client to generate server-client shared secrets, arranged in accordance with at least some embodiments described herein.

As described above, data cached by a server (e.g., the server 202) at a client the client 204) may be overwritten over time, without the knowledge of the server. As a result, at some point in time the data recorded by the server as being cached at the client may not match the actual data cached at the client.

According to a diagram 300, the server 202 may generate or otherwise obtain a set of secrets 310. In some embodiments, the secrets 310 may include random numbers generated by the server 202 or received from some other source. For example, a hardware random number generator may be used. The secrets may also be non-invertible hashes of particular data or source table. The number of secrets in the set of secrets 310 may match the number of data blocks in the source blocks 210, and the server 202 may encrypt each secret in the set of secrets 310 using a data block in the source blocks 210 to generate a set of encrypted secrets 320, for example by generating a hash of each source block to serve as a key for encrypting each secret using an established encryption algorithm. For example, the set of secrets 310 may include secrets 311-318. Each of the secrets 311-318 may be encrypted using a corresponding data block in the source blocks 210 to form encrypted secrets 321-328. The secret 311 may be encrypted using the data block 211 to form the encrypted secret 321, the secret 312 may be encrypted using the data block 212 to form the encrypted secret 322, the secret 313 may be encrypted using the data block 213 to form the encrypted secret 323, and so on. The server 202 may specifically use data blocks that have not been previously provided to the client 204, such as the blocks 212, 216, and 218, to encrypt secrets. These encrypted secrets may serve as decoys for attackers, as described below. Alternate decoys may also be encrypted using random or meaningless keys.

In some embodiments, the encryption may be performed using symmetric cryptography, where the data blocks in the source blocks 210 are used as the encryption keys for the encryption operation, either directly or by deriving a key from them as by hashing. The server 202 may then send the set of encrypted secrets 320 to the client 204 over the network 106. In some embodiments, the server 202 may also send a set of identifiers identifying the data block corresponding to each of the encrypted secrets in the set of encrypted secrets 320 to the client 204. For example, the set of identifiers may indicate that encrypted secret 321 corresponds to block 211, encrypted secret 322 corresponds to block 212, and encrypted secret 323 corresponds to block 213, and so on.

In response to receiving the set of encrypted secrets 320, the client 204 may recover one or more secrets in the set of secrets 310 using retained data blocks in the cache blocks 220. As depicted in the diagram 300, the client 204 may retain the blocks 213-215 in the cache blocks 220. The client 204 may then identify the encrypted secrets in the set of encrypted secrets 320 that correspond to the blocks 213-215, for example using the set of identifiers provided by the server 202. After identifying the appropriate encrypted secrets, which in this instance are the encrypted secrets 323-325, the client 204 may then use the blocks 213-215 to decrypt the encrypted secrets 323-325, thereby recovering a set of secrets 330 that includes the secrets 313-315.

Subsequently, the client 204 may then use the recovered secrets 330 to encrypt a message to the server 202. In some embodiments, the client 204 may use every secret in the recovered secrets 330 (i.e., secrets 313, 314, and 315) to encrypt the message, although in other embodiments the client 204 may use less than every secret. The client 204 may encrypt the message in a number of ways. For example, the client 204 may encrypt the message serially, by first encrypting the message with one secret to produce a first result, then encrypting the first result with another secret to produce a second result, then encrypting the second result with another secret, and so on. As another example, the client 204 may combine the secrets in the recovered secrets 330 to form a longer secret, then use the longer secret to encrypt the message. In some embodiments, the message itself may contain a secondary secret determined by the client 204 for use by the server 202 to further secure server-client communications. For example, the message may include a handshake, login information for the server 202, one of the secrets in the recovered secrets 330, or any other suitable authentication information to secure the server-client connection once a secure shared secret exists. After encryption, the client 204 may then send the encrypted message to the server 202. In some embodiments, the client 204 may also send an indication of the number of secrets (but not the identity of the secrets used to encrypt the message. For example, the client 204 may indicate that three secrets were used to encrypt the message if secrets 313, 314, and 315 were used to encrypt the message.

In response to receiving the encrypted message, the server 202 may recover the message using its record of data blocks previously provided to the client 204. For example, the server 202 may record that it previously provided the blocks 211, 213-215, and 217 to the client 204. Based on that knowledge, the server 202 may then know that the client 204 could at most recover five secrets from the encrypted secrets 320. Specifically, the server 202 may know that the client could at most recover the secrets 311, 313-315, and 317, since those secrets were encrypted using the blocks 211, 213-215, and 217. By iteratively using various combinations and permutations of two, three, four, and five of the secrets 311, 313-315, and 317 to attempt decryption of the encrypted message, the server 202 may be able to eventually recover the message. In some embodiments, the client 204 may provide an indication of the number and/or order of secrets used to encrypt the message, and the server 202 may use the number of secrets to reduce the number of combinations and permutations to be tested in order to recover the message.

While the server 202 may iterate through a number of combinations and permutations of secrets, the iteration may be relatively quick, especially when the number of data blocks previously provided to the client 204 by the server 202 and used for secret generation is relatively small. Meanwhile, an attacker somewhere in the network 106 may intercept the set of encrypted secrets 320 sent from the server 202 and the encrypted message sent from the client 204. The attacker may even know the set of source blocks 210, and, therefore, be able to determine the secrets 310. However, the attacker will not know the identity of the cache blocks 220, or even the identity of the data blocks previously provided by the server 202 to the client 204 to cache. As a result, the attacker may have to perform the iterative combination and permutation decryption process using all of the secrets 310. Moreover, the attacker may have to successfully decrypt the encrypted message, modify the message, and re-encrypt the message before the server 202 and the client 204 realize that the message has been compromised (e.g., by detecting an excessive time delay). If the number of secrets in the secrets 310 is substantially larger than the number of blocks previously provided to the client 204 to cache, the computational cost to the attacker to decrypt the encrypted message before the server 202 and the client 204 detect the excessive time delay may be intractably large. If an attacker instead opts to use randomly selected data blocks from the source blocks 210 to encrypt a counterfeit message, it may be likely that at least one of the data blocks is a decoy (i.e., not corresponding to a data block in the cache blocks 220), resulting in an invalid message.

Figure 4:
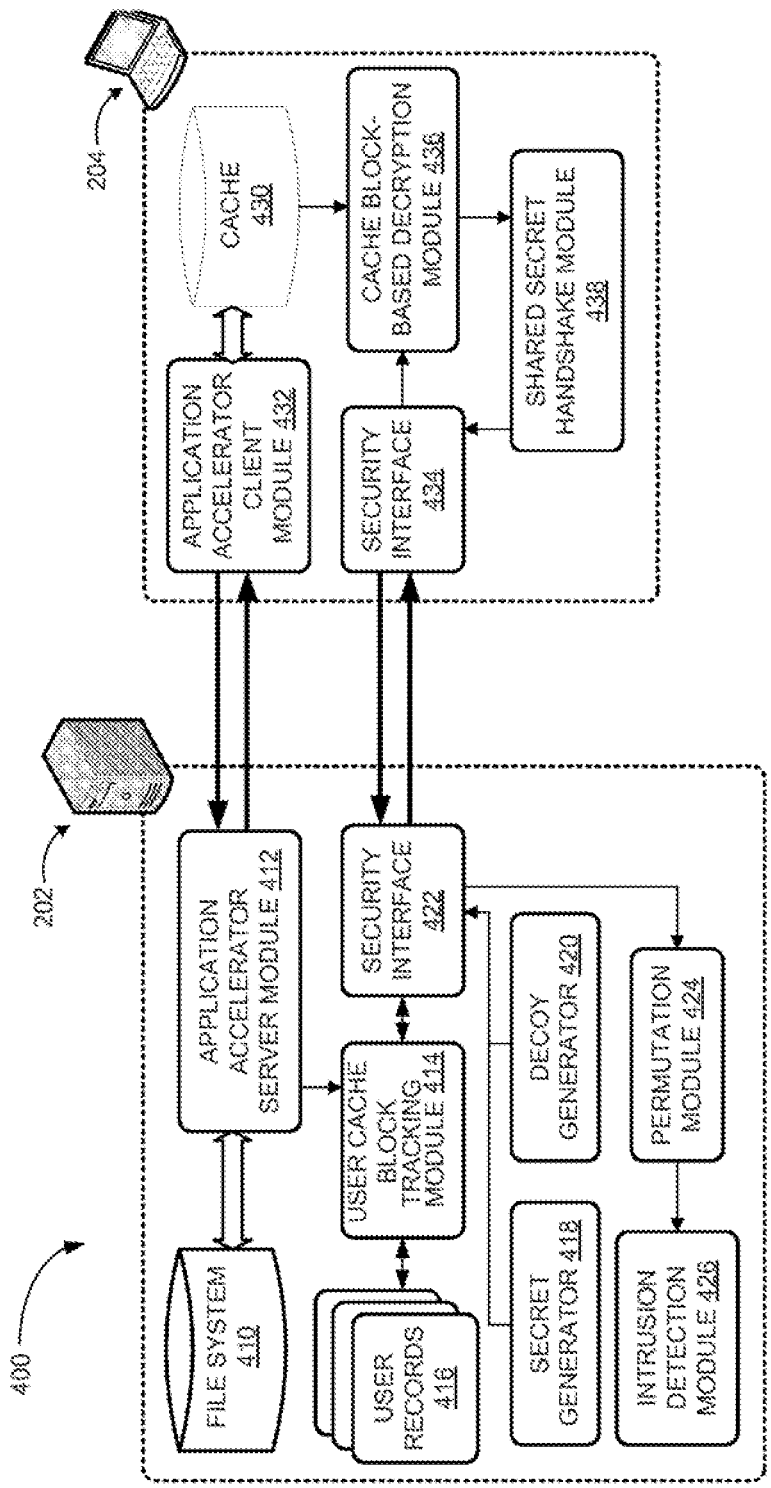
FIG. 4 illustrates an example system where cached data may be used to generate server-client shared secrets.

FIG. 4 illustrates an example system where cached data may be used to generate server-client shared secrets, arranged in accordance with at least some embodiments described herein.

According to a diagram 400, the server 202 may implement an application accelerator server module 412 that may accelerate web application execution on the client 204 by sending application data to an application accelerator client module 432 to cache at a cache 430. The application accelerator server module 412 may store and retrieve application data blocks (e.g., the source blocks 210) at a file system 410. Upon sending data blocks to the client 204 to cache, the application accelerator server module 412 may use a user cache block tracking module 414 to record the data blocks sent to the client 204 in user records 416.

A security interface 422 may then generate encrypted secrets (e.g., the encrypted secrets 320) intended for the client 204. For example, the security interface 422 may use a secret generator 418 (e.g., a random number generator) to generate a number of secrets corresponding to some or all of the number of cached data blocks at the client 204. The security interface 422 may then encrypt each secret with a corresponding cached data, block. The security interface 422 may also use a decoy generator 420 to generate a number of decoy secrets. Some members of encrypted secrets may be generated for source blocks that are known not to be in the client cache blocks. These secrets may be referred to as decoy secrets or encrypted decoys and be generated, in some examples, by the decoy generator 420. In some embodiments, the secret generator 418 may instead be used to generate the decoy secrets. The security interface 422 may then encrypt each of the decoy secrets with a corresponding data block that the application accelerator server module 412 has not previously provided to the client 204. Subsequently, the security interface 422 may associate each encrypted secret with an identifier identifying the particular data block used in the encryption of that secret. The security interface 422 may then transmit the encrypted secrets and the identifiers to the client 204.

The client 204 may itself include a security interface 434, which may receive the encrypted secrets and the identifiers from the server 202. In response to receiving the encrypted secrets and the identifiers, the security interface 434 may identify the data blocks cached at the cache 430 and use the identity of the cached data blocks and the provided identifiers to determine which encrypted secrets correspond to the cached data blocks. A cache block-based decryption module 436 may then decrypt the encrypted secrets corresponding to the cached data blocks using the corresponding cached data blocks. A shared secret handshake module 438 may then use the recovered secrets to encrypt a message containing authentication information (e.g., a handshake, login information, a recovered secret, etc.) for the server 202. The shared secret handshake module 438 may then provide the encrypted message to the security interface 434 to transmit to the security interface 422 of the server 202.

In response to receiving the encrypted message, the security interface 422 may forward the encrypted message to a permutation module 424. The permutation module 424, in turn, may attempt to decrypt the encrypted message using various permutations of data blocks previously provided to the client 204 and recorded in the user records 416. Once decryption is successful, the permutation module 424 may deliver the message and client cache status (represented by the actual data block permutation used to successfully decrypt the message) to an intrusion detection module 426. In some embodiments, the intrusion detection module 426 may be used to evaluate the security status of the client 204 and/or the connection between the server 202 and the client 204. For example, if client 204 was recently connected to server 202, yet had a relatively large change in the contents of cache 430, the security status of the client 204 and/or the server-client connection may be suspect. Similarly, the security status of the client 204 and/or the server-client connection may be suspect. When client 204 has been disconnected from server 202 for a long period of time, yet the contents of cache 430 has not changed significantly. The security status of the client 204 and/or the server-client connection may also be suspect if the security response took longer than expected or if the security response contains decryptions of decoys, for example.

Figure 5:
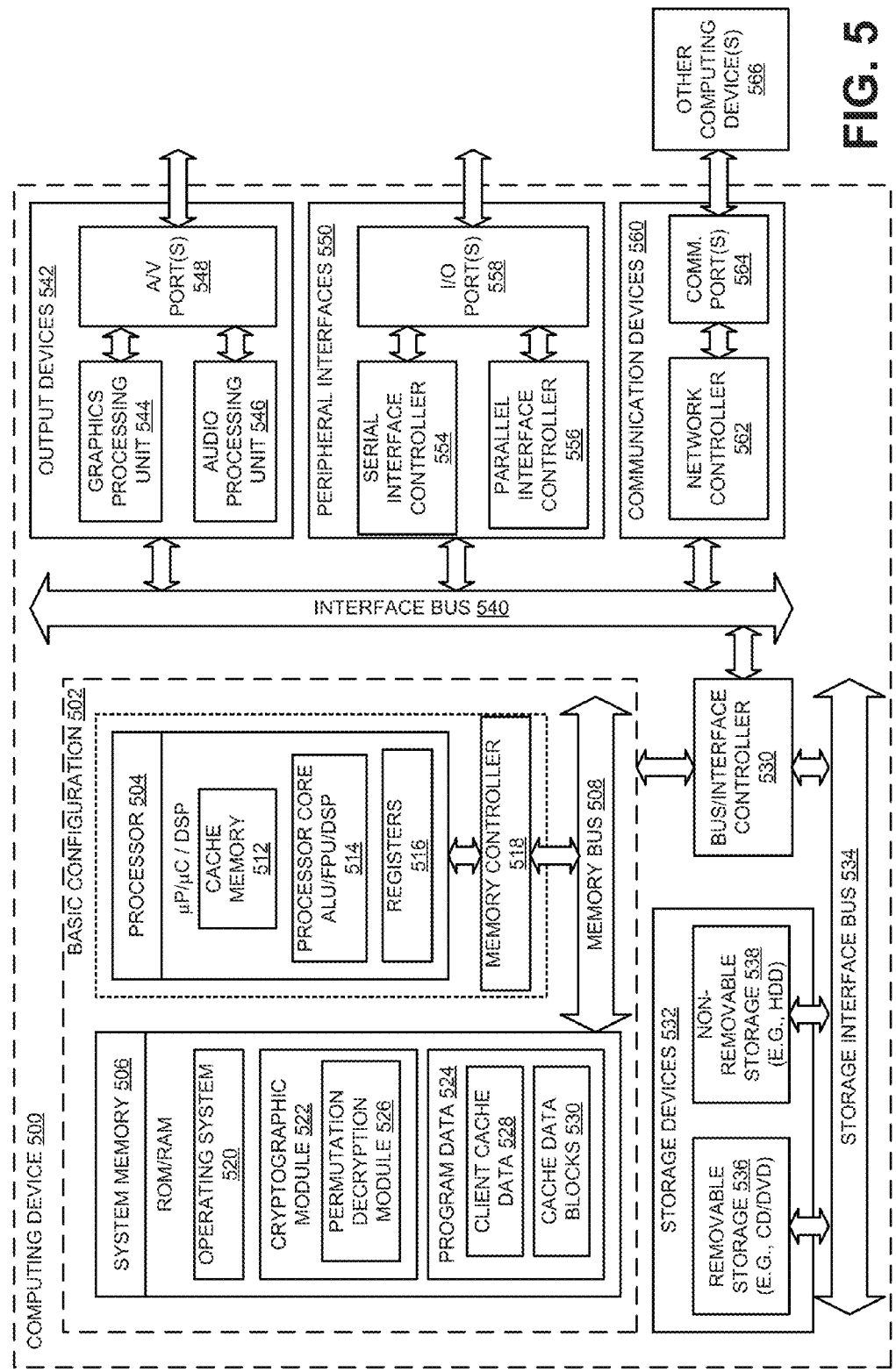
FIG. 5 illustrates a general purpose computing device, which may be used to generate server-client shared secrets using cached data.

FIG. 5 illustrates a general purpose computing device, which may be used to generate server-client shared secrets using cached data, arranged in accordance with at least some embodiments described herein.

For example, the computing device 500 may be used to generate server-client shared secrets using cached data as described herein. In an example basic configuration 502, the computing device 500 may include one or more processors 504 and a system memory 506. A memory bus 508 may be used to communicate between the processor 504 and the system memory 506. The basic configuration 502 is illustrated in FIG. 5 by those components within the inner dashed line.

Depending on the desired configuration, the processor 504 may be of any type, including hut not limited to a microprocessor (µP), a microcontroller (µC), a digital signal processor (DSP), or any combination thereof. The processor 504 may include one more levels of caching, such as a cache memory 512, a processor core 514, and registers 516. The example processor core 514 may include an arithmetic logic unit (ALU), a floating point unit (FPU), a digital signal processing core (DSP Core), or any combination thereof. An example memory controller 518 may also be used with the processor 504, or in some implementations memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a cryptographic module 522, and program data 524. The cryptographic module 522 may include a permutation decryption module 526 to implement using data block permutation to recover encrypted messages as described herein. The program data 524 may include, among other data, client cache data. 528, cache data blocks 529, or the like, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, hut is not limited to, RAM, ROM, EEPROM, flash memory, or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 to facilitate communication from various interface devices (e.g., one or more output devices 542, one or more peripheral interfaces 550, and one or more communication devices 560) to the basic configuration 502 via the bus/interface controller 530. Some of the example output devices 542 include a graphics processing unit 544 and an audio processing unit 546, which may be configured to communicate to various external devices such as a display or speakers via one or more A/V ports 548. One or more example peripheral interfaces 550 may include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 560 includes a network controller 562, which may be arranged to facilitate communications with one or more other computing devices 566 over a network communication link via one or more communication ports 564. The one or more other computing devices 566 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Figure 6:
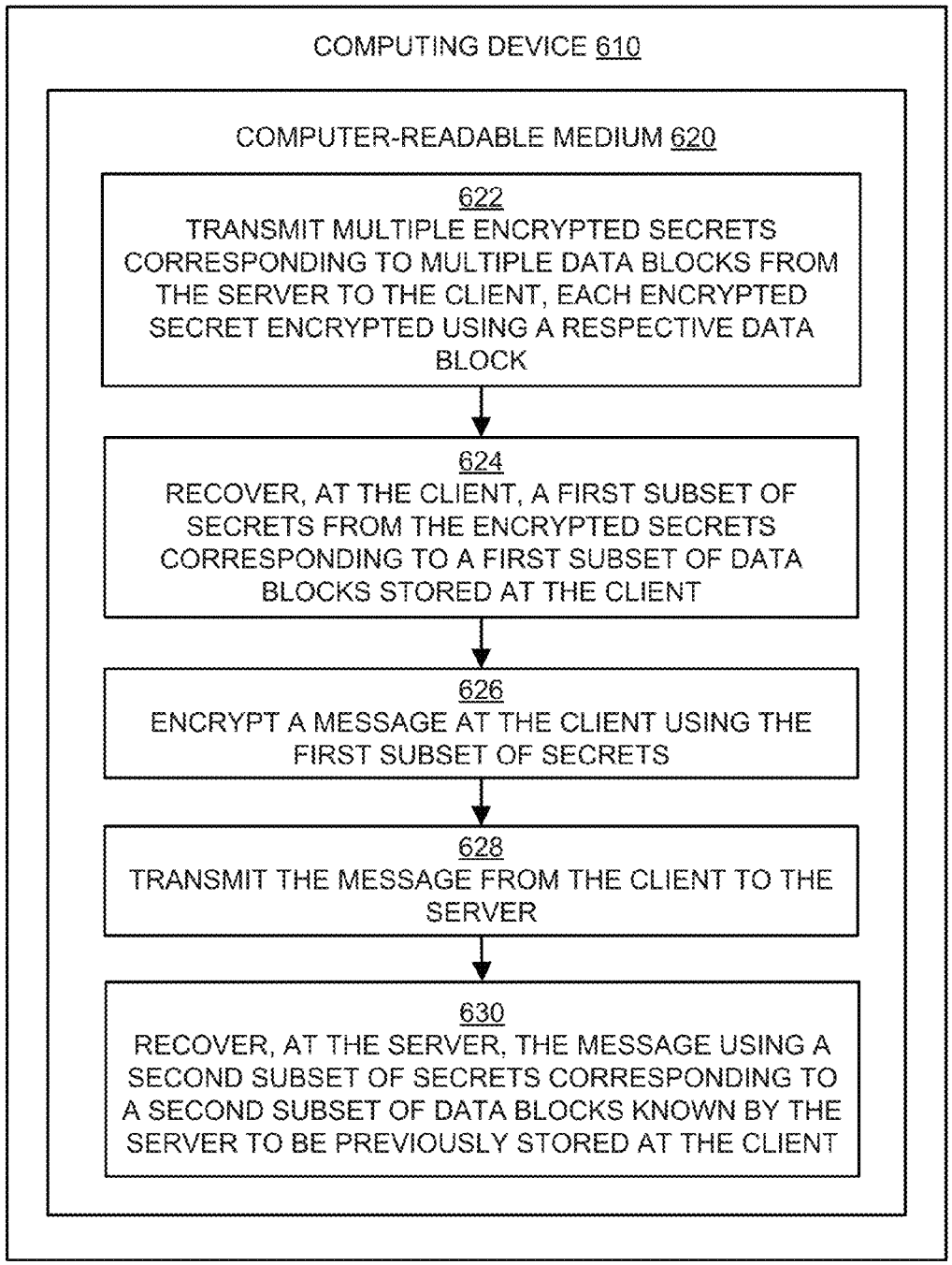
FIG. 6 is a flow diagram illustrating an example method to generate server-client shared secrets using cached data that may be performed by a computing device such as the computing device in FIG. 5.

FIG. 6 is a flow diagram illustrating an example method to generate server-client shared secrets using cached data that may be performed by a computing device such as the computing device in FIG. 5, arranged in accordance with at least some embodiments described herein.

Example methods may include one or more operations, functions or actions as illustrated by one or more of blocks 622, 624, 626, 628, and/or 630, and may in some embodiments be performed by a computing device such as the computing device 600 in FIG. 6. The operations described in the blocks 622-630 may also be stored as computer-executable instructions in a computer-readable medium such as a computer-readable medium 620 of a computing device 610.

An example process to generate server-client shared secrets may begin with block 622, "TRANSMIT MULTIPLE ENCRYPTED SECRETS CORRESPONDING TO MULTIPLE DATA BLOCKS FROM THE SERVER TO THE CLIENT, EACH ENCRYPTED SECRET ENCRYPTED USING A RESPECTIVE DATA BLOCK", where a set of encrypted secrets e.g., the encrypted secrets 320), each encrypted with a particular data block as described above, may be sent from a server (e.g., the server 202) to a client (e.g., the client 204).

Block 622 may be followed by block 624, "RECOVER, AT THE CLIENT, A FIRST SUBSET OF SECRETS FROM THE ENCRYPTED SECRETS CORRESPONDING TO A FIRST SUBSET OF DATA BLOCKS STORED AT THE CLIENT", where the client uses cached data blocks in a set of cache blocks (e.g., the cache blocks 220) stored at the client to recover secrets from the particular encrypted secrets in the set of encrypted secrets that correspond to those cache data blocks, as described above.

Block 624 may be followed by block 626, "ENCRYPT A MESSAGE AT THE CLIENT USING THE FIRST SUBSET OF SECRETS", where the client may use the recovered secrets to encrypt a message for the server as described above. In some embodiments, the message may contain a handshake or other information suitable to establish a secure server-client connection.

Block 626 may be followed by block 628, "TRANSMIT THE MESSAGE FROM THE CLIENT TO THE SERVER", where the client transmits the encrypted message to the server as described above.

Block 628 may be followed by block 630, "RECOVER, AT THE SERVER, THE MESSAGE USING A SECOND SUBSET OF SECRETS CORRESPONDING TO A SECOND SUBSET OF DATA BLOCKS KNOWN BY THE SERVER TO BE PREVIOUSLY STORED AT THE CLIENT", where the server recovers the message based on a record of data blocks previously provided to the client, as described above. In some embodiments, the server tests various permutations of the data blocks previously provided to the client to decrypt the message until a successful permutation is found.

FIG. 7 illustrates a block diagram of an example computer program product, arranged in accordance with at least some embodiments described herein.

In some examples, as shown in FIG. 7, a computer program product 700 may include a signal bearing medium 702 that may also include one or more machine readable instructions 704 that, when executed by, for example, a processor may provide the functionality described herein. Thus, for example, referring to the processor 504 in FIG. 5, the cryptographic module 522 may undertake one or more of the tasks shown in FIG. 7 in response to the instructions 704 conveyed to the processor 504 by the signal bearing medium 702 to perform actions associated with generating server-client shared secrets as described herein. Some of those instructions may include, for example, transmitting multiple encrypted secrets corresponding to multiple data blocks from the server to the client, each encrypted secret encrypted using a respective data block, recovering, at the client, a first subset of secrets from the encrypted secrets corresponding to a first subset of data blocks stored at the client, encrypting a message at the client using the first subset of secrets, transmitting the message from the client to the server, and/or recovering, at the server, the message using a second subset of secrets corresponding to a second subset of data blocks known by the server to be previously stored at the client, according to some embodiments described herein.

In some implementations, the signal bearing medium 702 depicted in FIG. 7 may encompass computer-readable medium 706, such as, hut not limited to a hard disk drive, a solid state drive, a Compact Disc (CD), a Digital Versatile Disk (DVD), a digital tape, memory, etc. In some implementations, the signal bearing medium 702 may encompass recordable medium 708, such as, but not limited to, memory, read/write (R/W) CDs, R/W DVDs, etc. In some implementations, the signal bearing medium 702 may encompass communications medium 710, such as, but not limited to, a digital and/or an analog communication medium (e.g., a fiber optic cable, a waveguide, a wired communications link, a wireless communication link, etc.). Thus, for example, the computer program product 700 may be conveyed to one or more modules of the processor 504 by an RE signal bearing medium, where the signal bearing medium 702 is conveyed by the wireless communications medium 710 (e.g., a wireless communications medium conforming with the IEEE 802.11 standard).

According to some examples, a method is provided to generate shared secrets between a server and a client. The method may include transmitting, by the server, multiple encrypted secrets corresponding to multiple data blocks to the client, the multiple encrypted secrets generated by encrypting each secret with a respective data block in the multiple data blocks. The method may further include recovering, by the client, a first subset of the multiple secrets from the encrypted secrets, where the first subset of secrets corresponds to a first subset of data blocks stored at the client and the first subset of data blocks is a subset of the multiple data blocks. The method may further include encrypting a message at the client using the first subset of secrets and transmitting, by the client, the message to the server. The method may further include recovering, by the server, the message using a second subset of the multiple secrets, where the second subset of secrets corresponds to a second subset of data blocks known by the server to be previously stored at the client and the second subset of data blocks is a subset of the multiple data blocks.

According to some embodiments, the method may further include transmitting, by the server, multiple identifiers to the client, each identifier associated with a respective encrypted secret in the multiple encrypted secrets and identifying the respective data block used to encrypt the respective encrypted secret. The method may further include recovering, by the client, the first subset of secrets by using the multiple identifiers to identify the encrypted secrets corresponding to the first subset of data blocks. The multiple secrets may include a random number and/or a third subset of secrets corresponding to a third subset of data blocks known by the server to not be stored at the client, and the third subset of data blocks may be a subset of the multiple data blocks.

According to other embodiments, the method may further include encrypting, by the client, the message using every secret in the first subset of secrets, and transmitting, by the client, an indicator of a number of secrets in the first subset of secrets to the server. The method may further include recovering, by the server, the message using a permutation of data blocks in the second subset of data blocks based on the indicator. The message may include a handshake, login information, and/or at least one secret from the first subset of secrets. The method may further include establishing a secondary secret shared between the server and the client based on the message. The first subset of data blocks may include data cached at the client for application acceleration.

According to other examples, a method for a server is provided to generate shared secrets with a client. The method may include generating multiple encrypted secrets corresponding to multiple data blocks by encrypting each secret in a not of multiple secrets with a respective data block in the multiple data blocks. The method may further include transmitting the multiple encrypted secrets to the client and receiving, from the client, a message encrypted using at least one secret from the multiple secrets. The method may further include recovering the message using a first subset of the multiple secrets, where the first subset of the secrets corresponds to a first subset of data blocks known by the server to be previously stored at the client and the first subset of data blocks is a subset of the multiple data blocks.

According to some embodiments, the method may further include transmitting multiple identifiers to the client, each identifier associated with a respective encrypted secret in the multiple encrypted secrets and identifying the respective data block used to encrypt the respective encrypted secret. The method may further include receiving, from the client, an indicator of a number of secrets used to encrypt the message, and recovering the message using a permutation of data blocks in the first subset of data blocks based on the indicator.

According to further examples, a server is provided to generate shared secrets with a client. The server may include a memory and a processing module. The memory may be configured to store instructions and multiple data blocks. The processing module may be configured to generate multiple encrypted secrets corresponding to multiple data blocks by encrypting each secret in a set of multiple secrets using a respective data block in the multiple data blocks. The processing module may be further configured to transmit the multiple encrypted secrets to the client and receive from the client a message encrypted using at least one secret from the multiple secrets. The processing module may be further configured to recover the message using a first subset of the multiple secrets, where the first subset of secrets corresponds to a first subset of data blocks known by the server to be previously stored at the client and the first subset of data blocks is a subset of the multiple data blocks.

According to some embodiments, the processing block may be further configured to transmit multiple identifiers to the client, each identifier associated with a respective encrypted secret in the multiple encrypted secrets and identifying the respective data block used to encrypt the respective encrypted secret. The multiple secrets may include a random number and/or a second subset of secrets corresponding to a second subset of data blocks known by the server to not be stored at the client, and the second subset of data blocks may be a subset of the multiple data blocks.

According to other embodiments, the processing block may be further configured to receive, from the client, an indicator of a number of secrets used to encrypt the message and recover the message using a permutation of data blocks in the first subset of data blocks based on the indicator. The message may include a handshake, login information, and/or at least one secret from the first subset of secrets. The processing block may be further configured to establish a secondary secret shared between the server and the client based on the message. The first subset of data blocks may include data cached at the client for application acceleration.

According to yet further examples, a method for a client is provided to use shared secrets generated with a server. The method may include receiving from the server multiple encrypted secrets corresponding to multiple data blocks and recovering a first subset of secrets from the encrypted secrets, where the first subset of secrets corresponds to the first subset of data blocks. The method may further include encrypting a message using the first subset of secrets and transmitting the message to the server.

According to some embodiments, the method may further include receiving, from the server, multiple identifiers, each identifier associated with a respective encrypted secret in the multiple encrypted secrets and identifying the respective data block used to encrypt the respective encrypted secret. The method may further include recovering the first subset of secrets by using the multiple identifiers to identify the encrypted secrets corresponding to the first subset of data blocks. The method may further include encrypting the message using every secret in the first subset of secrets and transmitting an indicator of a number of secrets in the first subset of secrets to the server.

According to some examples, a client is provided to generate shared secrets with a server. The client may include a memory and a processing module. The memory may be configured to store instructions and a first subset of data blocks, where the first subset of data blocks is a subset of multiple data blocks. The processing module may be configured to receive from the server multiple encrypted secrets corresponding to multiple data blocks and recover a first subset of secrets from the encrypted secrets, where the first subset of secrets corresponds to the first subset of data blocks. The processing module may be further configured to encrypt a message using the first subset of secrets and transmit the message to the server.

According to some embodiments, the processing block may be further configured to receive multiple identifiers from the server, each identifier associated with a respective encrypted secret in the multiple encrypted secrets and identifying the respective data block used to encrypt the respective encrypted secret. The processing block may be further configured to recover the first subset of secrets by using the multiple identifiers to identify the encrypted secrets corresponding to the first subset of data blocks. The multiple secrets may include a random number. The processing block may be further configured to encrypt the message using every secret in the first subset of secrets and transmit an indicator of a number of secrets in the first subset of secrets to the server.

According to other embodiments, the message may include a handshake, login information, and/or at least one secret from the first subset of secrets. The processing block may be further configured to establish a secondary secret shared between the server and the client based on the message. The first subset of data blocks may include data cached at the client for application acceleration.

According to other examples, a computer readable medium may store instructions which when executed on one or more computing devices may execute a method to generate shared secrets between a server and a client. The methods may be similar to the methods described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality in a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least or re of A, B, and C, etc." is used, in general such a construction is intended in the sense one having skill in the art would understand the convention "a system having at least one of A, B, and C" would include but not be limited to systems that have A alone, B alone, C alone, A and B together, A and C together, B and C together, and or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to generate shared secrets between a server and a client, the method comprising:
   transmitting, by the server, a plurality of encrypted secrets corresponding to a plurality of data blocks to the client, the plurality of encrypted secrets generated by encryption of each secret with a respective data block in the plurality of data blocks;
   recovering, by the client, a first subset of secrets from the plurality of encrypted secrets, wherein the first subset of secrets corresponds to a first subset of data blocks including data cached at the client for application acceleration, and the first subset of data blocks is a subset of the plurality of data blocks;
   encrypting a message at the client by use of the first subset of secrets;
   transmitting, by the client, the message to the server;
   recovering, by the server, the message by use of a second subset of secrets from the plurality of encrypted secrets, wherein the second subset of secrets corresponds to a second subset of data blocks known by the server to be previously stored at the client and the second subset of data blocks is a subset of the plurality of data blocks; and
   evaluating, by the server, a security status of the client and a security status of a connection between the server and the client in response to detecting one of: a change in contents of the data cached at the client when the client has been connected to the server, a lack of change in the contents of the data cached at the client when the client has been disconnected from the server for a period of time, and a security response that contains decryptions of encrypted secrets serving as decoys.

2. The method of claim 1, further comprising:
   transmitting, by the server, a plurality of identifiers to the client, each identifier associated with a respective encrypted secret in the plurality of encrypted secrets and identifying the respective data block used to encrypt the respective encrypted secret; and
   recovering, by the client, the first subset of secrets by use of the plurality of identifiers to identify the encrypted secrets corresponding to the first subset of data blocks.

3. The method of claim 1, wherein the plurality of encrypted secrets includes a random number.

4. The method of claim 1, wherein:
   the plurality of encrypted secrets includes a third subset of secrets corresponding to a third subset of data blocks known by the server to not be stored at the client; and
   the third subset of data blocks is a subset of the plurality of data blocks.

5. The method of claim 1, further comprising:
   encrypting, by the client, the message by use of every secret in the first subset of secrets;
   transmitting, by the client, an indicator of a number of secrets in the first subset of secrets to the server; and
   recovering, by the server, the message by use of a permutation of data blocks in the second subset of data blocks based on the indicator.

6. The method of claim 1, wherein the message includes at least one of a handshake, login information, and at least one secret from the first subset of secrets.

7. The method of claim 1, further comprising establishing a secondary secret shared between the server and the client based on the message.

8. A server configured to generate shared secrets with a client, the server comprising:
   a memory configured to store instructions and a plurality of data blocks; and
   a processing module configured to:
      generate a plurality of encrypted secrets corresponding to the plurality of data blocks by encryption of each secret in a plurality of secrets by use of a respective data block in the plurality of data blocks;
      transmit the plurality of encrypted secrets to the client;
      receive, from the client, a message encrypted by use of at least one secret from the plurality of encrypted secrets and an indication of a number of secrets from the plurality of encrypted secrets used to encrypt the message; and
      recover the message by iteratively using combinations and permutations of a first subset of secrets from the encrypted plurality of secrets to decrypt the message, wherein the first subset of secrets corresponds to a first subset of data blocks known by the server to be previously stored at the client that includes data cached at the client for application acceleration, and the first subset of data blocks is a subset of the plurality of data blocks, and wherein the number of secrets indicated by the client is employed to reduce a number of the combinations and permutations attempted in order to recover the message.

9. The server of claim 8, wherein the processing module is further configured to:
   transmit a plurality of identifiers to the client, each identifier associated with a respective encrypted secret in the plurality of encrypted secrets and identify the respective data block used to encrypt the respective encrypted secret.

10. The server of claim 8, wherein the plurality of encrypted secrets includes a random number.

11. The server of claim 8, wherein:
    the plurality of encrypted secrets includes a second subset of secrets corresponding to a second subset of data blocks known by the server to not be stored at the client; and
    the second subset of data blocks is a subset of the plurality of data blocks.

12. The server of claim 8, wherein the message includes at least one of a handshake, login information, and at least one secret from the plurality of secrets.

13. The server of claim 8, wherein the processing module is further configured to establish a secondary secret shared between the server and the client based on the message.

14. A client configured to generate shared secrets with a server, the client comprising:
    a memory configured to store instructions and a first subset of data blocks that includes data cached at the client for acceleration of a web application, wherein the first subset of data blocks is a subset of a plurality of data blocks; and
    a processing module configured to:
       receive, from the server, a plurality of encrypted secrets corresponding to the plurality of data blocks;
       recover a first subset of secrets from the plurality of encrypted secrets, wherein the first subset of secrets corresponds to the first subset of data blocks;
       encrypt a message by use of the first subset of secrets;
       transmit the message to the server; and
       in response to one of a conclusion or a pause of a session of the web application, indicate the memory as available although the memory still comprises the first subset of data blocks that includes the data cached at the client for the acceleration of the web application in order to prevent the first subset of data blocks from consuming visible amounts of the memory and impacting other systems or applications operating on the client.

15. The client of claim 14, wherein the processing module is further configured to:
  receive, from the server, a plurality of identifiers, each identifier associated with a respective encrypted secret in the plurality of encrypted secrets and identify the respective data block used to encrypt the respective encrypted secret; and
  recover the first subset of secrets by use of the plurality of identifiers to identify the encrypted secrets corresponding to the first subset of data blocks.

16. The client of claim 14, wherein the first subset of secrets includes a random number.

17. The client of claim 14, wherein the processing module is further configured to:
  encrypt the message by use of every secret in the first subset of secrets; and
  transmit an indicator of a number of secrets in the first subset of secrets to the server.

18. The client of claim 14, wherein the message includes at least one of a handshake, login information, and at least one secret from the first subset of secrets.

19. The client of claim 14, wherein the processing, module is further configured to establish a secondary secret shared between the server and the client based on the message.

* * * * *